United States Patent [19]

Kato

[11] 4,006,994
[45] Feb. 8, 1977

[54] TAP CHUCKING MEANS

[76] Inventor: Taizo Kato, 3007-104, Obatahigashijima, Moriyamaku, Nagoya, Japan

[22] Filed: Apr. 28, 1976

[21] Appl. No.: 681,002

[30] Foreign Application Priority Data

May 1, 1975 Japan .................. 50-53476

[52] U.S. Cl. .................................. 408/142
[51] Int. Cl.² .............................. B23Q 5/22
[58] Field of Search .................. 408/142, 238, 239; 279/1 R, 9, 9 A

[56] References Cited

UNITED STATES PATENTS 3,697,186  10/1972  Smith ........................ 408/142
3,791,186   2/1974  Johnson ..................... 408/142

Primary Examiner—Harrison L. Hinson

[57] ABSTRACT

A tap chucking means is provided which is adapted to automatically stop rotation of a tap at a predetermined depth and to pull the tap out from the work by reversing the rotation of the spindle. A cylindrical body has a bore in one end in which a socket shaft is slidably and rotatably mounted. The socket shaft is adapted to mount a chuck at its exterior end and is resiliently biased into the body. A clutch pin passes transversely through the socket shaft and has beveled inner faces on both ends of the pin. A pair of drive pins are disposed along opposite sides of the socket shaft for engagement by the clutch pin and are axially slidable in axial grooves formed longitudinally in the mid-portion of the cylindrical body. The drive pins are resiliently biased towards the open end of the body.

2 Claims, 6 Drawing Figures

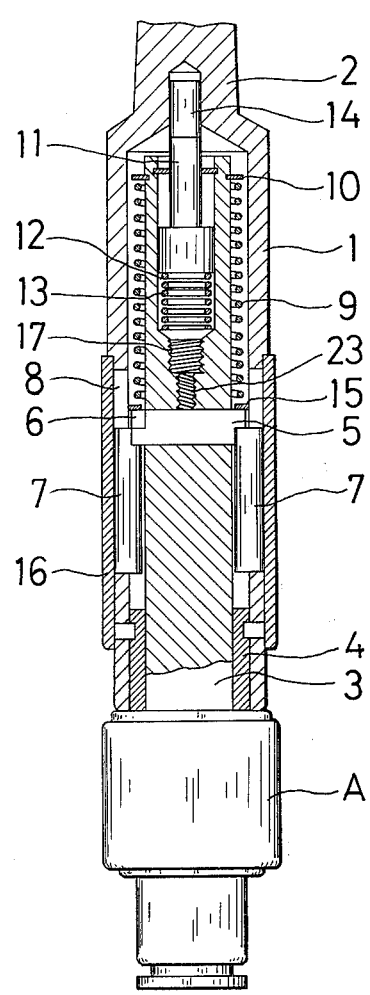
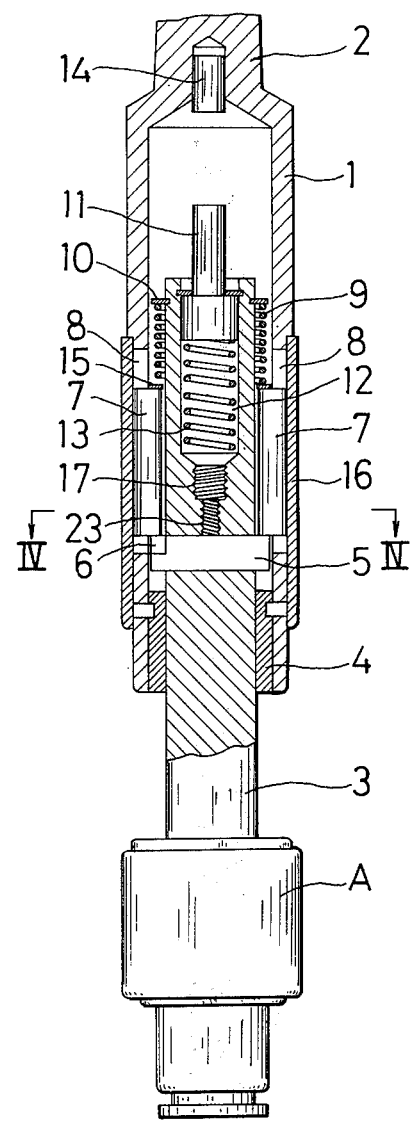

TAP CHUCKING MEANS

BACKGROUND OF THE INVENTION

Various types of tap chucking means have been previously employed for tapping work to a predetermined depth. These prior devices incorporate clutch mechanism to automatically stop tap rotation while allowing the spindle to rotate continuously when tapping work to a predetermined depth is completed. All of these prior devices, however, have a complicated construction and have many limitations in handling. Further, various parts must be exchanged with others in order to adjust the tapping depth so that these prior tapping means are often quite impractical.

SUMMARY OF THE INVENTION

A major object of the present invention is to provide a simple depth controlled tap chucking means capable of changing the depth of tapping simply by using different lengths of pins. A tap chucking means is provided which is adapted to mount a tapping chuck and which includes a cylindrical body having a shank at one end and an opening at the other end. A socket shaft is rotatably and slidably mounted in the body and is resiliently biased toward the shank end of the body. A clutch pin is secured transversely through the socket shaft and has the inner faces of both ends of the pin partially beveled. Drive pins are axially disposed along the socket shaft and are slidably mounted in longitudinal grooves formed axially in the mid-portion of the body.

BRIEF DESCRIPTION OF THE DRAWINGS

The invention may best be understood when considered in light of the following detailed description taken in conjunction with the accompanying drawings, wherein:

FIG. 2 is a vertical, cross-sectional view of the first embodiment of the invention in another condition;

FIG. 3 is a vertical, cross-sectional view of the first embodiment of the invention upon completion of tapping work;

DETAILED DESCRIPTION OF THE INVENTION

Figure 1:
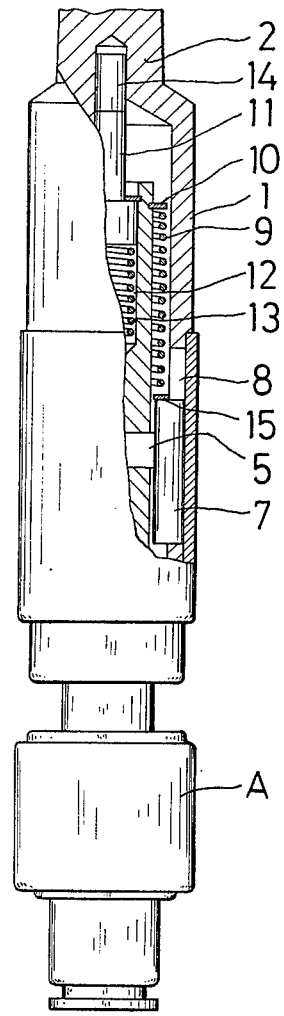
FIG. 1 is an elevational view of partially in section of a first embodiment of the invention in an unloaded condition.
Figure 4:
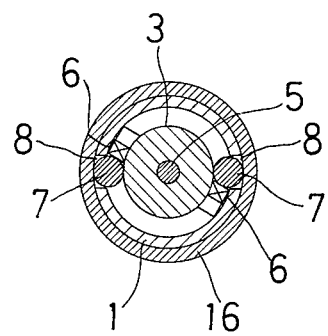
FIG. 4 is a cross-sectional view taken along the line IV—IV of FIG. 3.

Referring to FIGS. 1–4, a cylindrical body 1 has a shank 2 formed integrally on the top of the body and an opening or longitudinal bore at the bottom of the body. A tapping chuck A is mounted on the bottom of a socket shaft 3. The socket shaft is rotatably and vertically slidably mounted in said body 1 by a holding member 4 secured to the inner wall of the opening of said body 1.

A clutch pin 5, preferably of square of rectangular cross section, laterally penetrates and passes transversely through the socket shaft 3 at the mid-portion thereof and has partially beveled inner faces 6 on the upper portions of both ends of the clutch pin 5. The faces 6 are formed diagonally in the same direction of rotation. Oppositely threaded set screws 17 and 23 secure the clutch pin 5 to the socket shaft 3.

Driving pins 7, preferably of circular cross section, are diametrically disposed on the outside of the socket shaft 3. The driving pins 7 are mounted to vertically slide in longitudinal grooves 8 diametrically provided in the cylindrical body 1 at the intermediate or middle portion of the body. The vertical sides of the clutch pin 5 at both ends engage the driving pins 7.

A compression spring 9 is mounted between a spring seat 10, secured to the upper end of the socket shaft 3, and a seat ring 15 resting on either of the clutch pin 5 and the upper ends of the driving pins 7. In this manner, the socket shaft 3 is spring-loaded upwardly and the driving pins 7 are spring-loaded toward the opening of the cylindrical body 1.

A limit pin 11 is slidably fitted into an axial bore 12 provided in the upper end of the socket shaft 3. A compression pressing spring 13 is mounted between the pin 11 and the socket shaft 3 in the bore 12. The top of the limit pin 11 projects upwardly with respect to the socket shaft 3 and, when no load is applied as shown in FIG. 1, strikes against a fixed pin 14 embedded in the top wall of the cylindrical body 1, thereby resiliently downwardly pressing the socket shaft 3 against the compression spring 9 so that the clutch pin 5 is disposed in engagement with the driving pins 7. A spring seat 15 supports the bottom of the compression spring 9 against the driving or clutch pins.

An outer cylindrical member 16 is circumferentially mounted to the outer surface of the cylindrical body 1 and covers the longitudinal grooves 8 into which the driving pins 7 are fitted.

In operation, after a tap is attached to the tapping chuck A fixed to the socket shaft 3, the cylindrical body 1 is rotated and lowered so that the tap is contacted against a work. Upon such contact, socket shaft 3, which has been downwardly pressed resiliently by the pressing spring 13 inside the cylindrical body 1, is pushed upward against this pressing spring 13 such as shown in FIG. 2, so that the shock of the contact can be absorbed. The rotation of the body 1 is then transmitted to the socket shaft 3 by engagement of the driving pins 7 with the clutch pin 5.

Figure 5:
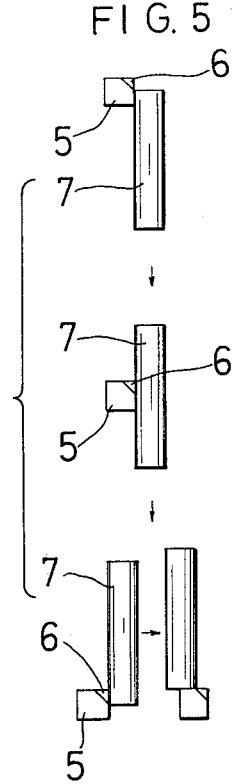
FIG. 5 is a functional schematic view showing various relationships between the driving pins and clutch pin of the first embodiment during tapping work; and, FIG. 6 is a vertical, cross-sectional view of a second embodiment of the invention.

With the cylindrical body 1 held at a fixed position, the socket shaft 3 lowers and compresses the spring 9 as the tapping work progresses. The engagement between the clutch pin 5 and the driving pins 7 moves downward, as illustrated in FIG. 5 until finally the bottom of the driving pins 7 are in engagement with the clutch pins. When the bottoms of the driving pins 7 contact the bevel faces 6 of the clutch pin 5, the bottoms of the driving pins 7 slide over the bevel faces 6 to thereby disengage the driving pins 7 from the clutch pin 5, whereby the cylindrical body races and the socket shaft 3 stops rotating, as shown in FIGS. 3 and 5.

When the cylindrical body 1 is rotated in the reverse direction at this position, the vertical sides of the clutch pin 5 opposite the bevel sides 6 on the both ends of pin 5 will engage the bottom of the driving pins 7 to again transmit rotational motion to the socket shaft 3 so that the tap is threaded back from the work. By this method, tapping work is completed to a predetermined depth as from the position at which the cylindrical body 1 has been held fixedly from lowering.

Figure 6:
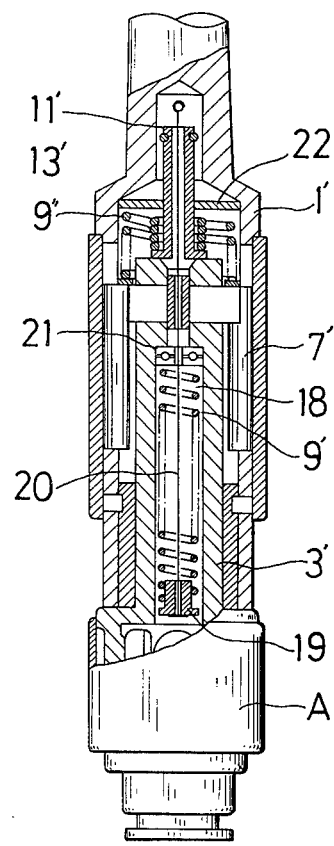

In a second embodiment of this invention shown in FIG. 6, a compression spring 9' is provided between the top end of a longitudinal bore 18 in the socket shaft 3' and a spring seat 19 movably fitted in the longitudinal bore 18. The spring seat 19 is connected to the bottom of a hanging wire 20, one end of which wire is fixed to the top wall of the cylindrical body 1'. The compression spring 9' thus pushes the socket shaft 3' upwardly in the cylindrical body 1'. A thrust bearing 21 bears against one end of the compression spring 9' inside the longitudinal bore 18 of the socket shaft 3' and prevents the rotation of the socket shaft 3' from being transmitted to the compression spring 9'. A compression spring 9'' is provided between the spring seat 22 at the top of the cylindrical body 1' and the driving pins 7'. The compression spring 9'' pushes driving pins 7' toward the bottom opening of the cylindrical body 1'. A compression pressing spring 13' is provided between the spring seat 22 at the top wall of the cylindrical body 1' and a limit pin 11'. The pressing spring 13' pushes the limit pin 11' downwardly. The bottom end of the limit pin 11' abuts the top of the socket shaft 3'.

The positions of the driving pins 7' with respect to the cylindrical body 1' are changed from the first embodiment by incorporating or placing the spring 9' in the socket shaft 3' in this second embodiment, whereby the entire length of the tap chucking means can be shortened.

The spring seat 22 is provided at the top wall of the cylindrical body 1'. The spring seat 22 retains the top ends of the compression spring 9'' and pressing spring 13', while permitting the limit pin 11'; to pass vertically through an aperture in the spring seat.

As described hereinbefore, in the tap chuching means of the present invention, the rotation of the cylindrical body is transmitted to the socket shaft through engagement of the driving pins, which are spring-loaded downwardly by the compression spring, with the ends of the clutch pin. The engagement points of the driving pins with the clutch pin move as the tap advances against the work. When the tapping work for a predetermined depth is completed, the driving pins automatically disengage from the clutch pin, thereby allowing the cylindrical body to race and stopping the rotation of the chuck shaft.

Highly reliable and precise tapping of any desired depth can therefore be achieved by determining a position for stopping to lower the cylindrical body relative to the work prior to tapping work. When reversing the rotation of the cylindrical body for pulling the tap out of the work, the driving pins engage with the clutch pin to transmit the rotation so that no special operation is required, thus resulting in convenience in handling.

The socket shaft is spring-loaded by the pressing spring acting between the upper central part of the shaft and the cylindrical body when no load is applied. Shock can be therefore absorbed when the tap cuts into the work and breakage of the tap can be avoided, thus providing a smooth initial cut into the work.

Adjustment of tapping depth can easily be accomplished also by changing the limit pin or driving pins to facilitate tapping to various depths at high efficiency.

Thus, a tap chucking means in accordance with the present invention is simple in construction and performs a stable function over a long period of time.

Various modifications and changes may be made in the embodiments shown and described herein, all within the scope of the invention as claimed.

It will be understood that the tapping spindle could be used upside down so that socket shaft 3 is driven by the head and a tap is chucked to spindle 1.

What is claimed is:

1. A tap chucking means adapted to mount a tapping chuck comprising:
   a cylindrical body having a shank at one end and an opening at the other end;
   a socket shaft, having one end adapted to mount the tapping chuck, rotatably and slidably mounted in said cylindrical body and resiliently biased toward the shank end of said body;
   a clutch cross pin, secured transversely through said socket shaft, having partially beveled inner faces on both ends of said clutch pin; and,
   drive pins diametrically disposed along said socket shaft, said drive pins being axially slidable in axial grooves formed in the mid-portion of said cylindrical body, said drive pins being resiliently biased toward said opening of said cylindrical body,
   whereby rotational motion of either of said cylindrical body and said socket shaft is transmitted to the other by engagement of said cross pin with said drive pins, said engagement being released when said cross pin reaches the bottom of said drive pins, and said cross and drive pins are reengaged by reverse rotation of either of said cylindrical body and socket shaft.

2. A tap chucking means adapted to mount a tapping chuck, comprising;
   a cylindrical body having a shank at the top thereof and an opening at the bottom thereof;
   a socket shaft having a lower end mounted to the tapping chuck, said socket shaft being held rotatably and vertically slidably in said cylindrical body and spring-loaded toward the top of said body;
   a clutch cross pin secured across said socket shaft and having partial bevel faces on the upper portions of both ends of said clutch pin; and,
   axial pins diametrically disposed at the outside of said socket shaft, said axial pins being axially slidable in axial grooves which are provided at the middle part of said cylindrical body and being spring-loaded toward said opening of said cylindrical body,
   whereby the rotation of either of said cylindrical body and said socket shaft is transmitted to the other by engagement of said cross pin with said axial pins, said engagement being released when said cross pin comes down to the bottom of said axial pins, and said cross and axial pins being reengaged by means of reverse rotation of either of said cylindrical body and socket shaft.

* * * * *